(12) United States Patent
Choi et al.

(10) Patent No.: US 8,193,259 B2
(45) Date of Patent: Jun. 5, 2012

(54) UV-CURABLE PRESSURE-SENSITIVE ADHESIVE COMPOSITION WITH A FLUORINATED ACRYLIC BINDER RESIN AND PRESSURE-SENSITIVE ADHESIVE FILM USING THE SAME

(75) Inventors: Seung Jib Choi, Uiwang-si (KR); Kyoung Jin Ha, Uiwang-si (KR); Jun Suk Kim, Uiwang-si (KR); Kyung Ju Lee, Uiwang-si (KR); Chang Beom Chung, Uiwang-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 450 days.

(21) Appl. No.: 12/285,339

(22) Filed: Oct. 2, 2008

(65) Prior Publication Data

US 2009/0143497 A1 Jun. 4, 2009

(30) Foreign Application Priority Data

Dec. 3, 2007 (KR) .................. 10-2007-0124378

(51) Int. Cl.
*C08G 18/67* (2006.01)
*C07D 303/40* (2006.01)
*C08F 20/22* (2006.01)

(52) U.S. Cl. ........... 522/97; 522/170; 522/182; 522/156

(58) Field of Classification Search ............... 522/170, 522/182, 97, 156
See application file for complete search history.

(56) References Cited

U.S. PATENT DOCUMENTS

| 7,592,405 B2 | 9/2009 | Otaguro et al. |
| 2004/0242822 A1* | 12/2004 | Gawrisch et al. ............. 526/266 |
| 2007/0102349 A1* | 5/2007 | Duong et al. ............ 210/500.27 |
| 2008/0027179 A1* | 1/2008 | Zollner et al. ................ 525/222 |

FOREIGN PATENT DOCUMENTS

KR 10-2006-0125758 A 12/2006

OTHER PUBLICATIONS

Machine English translation of JP 08-027239; Kazuhiro et al.*
DOW Products; 2-ethylhexyl acrylate proporties.*
Stevens, Malcolm P., Polymer Chemistry: An Introduction, Oxford 1999 (p. 172).*

* cited by examiner

*Primary Examiner* — Mark Eashoo
*Assistant Examiner* — Jessica Paul
(74) *Attorney, Agent, or Firm* — Lee & Morse, P.C.

(57) ABSTRACT

A photocurable pressure-sensitive adhesive (PSA) composition includes an acrylic PSA binder, the acrylic PSA binder including at least one fluoro group in an amount of about 6 mol % to about 30 mol % based on a total amount of the acrylic PSA binder, a thermal curing agent, and a photoinitiator.

20 Claims, No Drawings

UV-CURABLE PRESSURE-SENSITIVE ADHESIVE COMPOSITION WITH A FLUORINATED ACRYLIC BINDER RESIN AND PRESSURE-SENSITIVE ADHESIVE FILM USING THE SAME

BACKGROUND OF THE INVENTION

1. Field of the Invention

Example embodiments relate to an ultraviolet (UV)-curable pressure-sensitive adhesive (PSA) composition and to a PSA film using the same. More particularly, example embodiments relate to a UV-curable PSA composition including a fluorinated acrylic PSA binder, a thermal curing agent, and a photoinitiator, and to a PSA film including the PSA composition.

2. Description of the Related Art

A semiconductor device may be manufactured by attaching a large-diameter silicon wafer to a substrate, e.g., a dicing tape, dicing the wafer, e.g., cutting and separating the silicon wafer into semiconductor chips, peeling the chips from the substrate, and adhering the chips onto a semiconductor package base, e.g., a lead frame. Conventionally, a curable liquid adhesive may be used to attach the silicon wafer and/or chips to a respective substrate, e.g., the dicing tape. Use of a conventional curable liquid adhesive, however, may contaminate components of the conventional semiconductor device with fluid components.

SUMMARY OF THE INVENTION

Example embodiments are therefore directed to a UV-curable PSA composition and to a PSA film using the same, which substantially overcome one or more of the shortcomings and disadvantages of the related art.

It is therefore a feature of an example embodiment to provide a UV-curable PSA composition with a fluorinated acrylic PSA binder, a thermal curing agent, and a photoinitiator.

It is another feature of an example embodiment to provide a UV-curable PSA composition exhibiting excellent pick-up properties after UV-irradiation.

It is yet another feature of an example embodiment to provide a UV-curable PSA film including a UV-curable PSA composition having one or more of the above features.

At least one of the above and other features and advantages of the present invention may be realized by providing a photocurable PSA composition, including an acrylic PSA binder, the acrylic PSA binder including at least one fluoro group in an amount of about 6 mol % to about 30 mol % based on a total amount of the acrylic PSA binder, a thermal curing agent, and a photoinitiator.

The composition may include about 0.5 parts by weight to about 10.0 parts by weight of the thermal curing agent and about 0.001 parts by weight to about 0.05 parts by weight of the photoinitiator, based on 100 parts by weight of the acrylic PSA binder. The acrylic PSA binder may include at least one fluoro group, at least one vinyl group, at least one hydroxyl group, and at least one epoxy group. The acrylic PSA binder may include at least one epoxy group in an amount of about 2 mol % to about 20 mol % and at least one vinyl group in an amount of about 10 mol % to about 25 mol %, based on the total amount of the acrylic PSA binder. The acrylic PSA binder may have an acid value of about 1 or less. The acrylic PSA binder may be a reaction product of a polyol having hydroxyl functional groups and a monomer having isocyanate and vinyl groups, the polyol being a reaction product of an acrylic monomer, an acrylate monomer with at least one hydroxyl group, an acrylate monomer with at least one epoxy group, and an acrylate monomer with at least one fluoro group.

The polyol may include the acrylic monomer in an amount of about 50 parts by weight to about 75 parts by weight, the acrylate monomer with the hydroxyl group in an amount of about 15 parts by weight to about 30 parts by weight, the acrylate monomer with the epoxy group in an amount of about 2 parts by weight to about 20 parts by weight, the acrylate monomer with at least one fluoro group in an amount of about 2 parts by weight to about 10 parts by weight, and a polymerization initiator in an amount of about 0.1 parts by weight to about 0.5 parts by weight. An equivalent ratio of the monomer having the isocyanate and vinyl groups to the hydroxyl groups in the polyol may be about 0.5:1 to about 0.9:1. The acrylic monomer may include one or more of 2-ethylhexyl methacrylate, isooctyl acrylate, 2-ethylhexyl acrylate, ethyl acrylate, n-butyl acrylate, iso-butyl acrylate, and octadecyl methacrylate. The acrylic monomer may have a glass transition temperature of about (−50)° C. or less. The acrylate monomer with the hydroxyl group may include one or more of 2-hydroxyethyl methacrylate, hydroxyethyl acrylate, 4-hydroxybutyl acrylate, hydroxypropyl methacrylate, and vinylcaprolactam. The acrylate monomer having the epoxy group may include glycidyl methacrylate or glycidyl acrylate. The monomer having the isocyanate and vinyl groups may include one or more of 2-isocyanatoethyl methacrylate, α,α-dimethyl-m-isopropenylbenzyl isocyanate, 2-isocyanatoethyl 2-propenoate, and 1,1-bis(acryloyloxymethylethyl isocyanate). The monomer having at least one fluoro group may include one or more of trifluoromethyl methacrylate, trifluoroethyl methacrylate, hexafluoropropyl methacrylate, and heptadecafluorodecyl acrylate. The acrylic PSA binder may have a weight average molecular weight of about 150,000 to about 800,000.

At least one of the above and other features and advantages of the present invention may be realized by providing a PSA film including a dried photocurable PSA composition, the PSA composition having an acrylic PSA binder, the acrylic PSA binder having at least one fluoro group in an amount of about 6 mol % to about 30 mol % based on a total amount of the acrylic PSA binder, a thermal curing agent, and a photoinitiator. A peel strength of the PSA film with respect to a substrate attached thereto may be about 0.05 N/25 mm or less after photocuring as determined by KS-A-01107(8).

At least one of the above and other features and advantages of the present invention may be realized by providing a method of forming a photocurable PSA composition, including forming an acrylic PSA binder, the acrylic PSA binder including at least one fluoro group in an amount of about 6 mol % to about 30 mol % based on a total amount of the acrylic PSA binder, adding a thermal curing agent, and adding a photoinitiator. Forming the acrylic PSA binder may include reacting a polyol having hydroxyl functional groups with a monomer having isocyanate and vinyl groups, the polyol being a reaction product of an acrylic monomer, an acrylate monomer with at least one hydroxyl group, an acrylate monomer with at least one epoxy group, and an acrylate monomer with at least one fluoro group. The polyol may include the acrylic monomer in an amount of about 50 parts by weight to about 75 parts by weight, the acrylate monomer with the hydroxyl group in an amount of about 15 parts by weight to about 30 parts by weight, the acrylate monomer with the epoxy group in an amount of about 2 parts by weight to about 20 parts by weight, the acrylate monomer with the fluoro group in an amount of about 2 parts by weight to about 10 parts by weight, and a polymerization initiator in an amount of about 0.1 parts by weight to about 0.5 parts by weight.

DETAILED DESCRIPTION OF THE INVENTION

Korean Patent Application No. 10-2007-0124378, filed on Dec. 3, 2007, in the Korean Intellectual Property Office, and entitled: "UV-Curable Pressure-Sensitive Adhesive Composition Comprising Fluorinated Acrylic Binder Resin and Pressure-Sensitive Adhesive Film Using the Same," is incorporated by reference herein in its entirety.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the terms "a" and "an" are open terms that may be used in conjunction with singular items or with plural items. For example, the term "an acrylic monomer" may represent a single compound, e.g., 2-ethylhexyl methacrylate, or multiple compounds in combination, e.g., 2-ethylhexyl methacrylate mixed with n-butyl acrylate.

As used herein, molecular weights of polymeric materials are weight average molecular weights, unless otherwise indicated.

As used herein, the language "parts by weight, based on a total amount of a polyol" or "parts by weight, based on a total amount of an acrylic PSA binder" is exclusive of solvent, unless otherwise indicated. That is, as used herein, the point of reference "the total amount of the polyol" or "the total amount of the acrylic PSA binder" does not include solvent. For example, where a composition is composed of two components A and B, with A present in 35 parts by weight and present in 65 parts by weight, based on the total amount of the polyol, the addition of 10 parts by weight of solvent to the composition would result in the composition continuing to have 35 parts by weight A and 65 parts by weight B, based on the total amount of the polyol.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an example embodiment, a photocurable, i.e., UV-curable, PSA composition may include a fluorinated photocurable acrylic PSA binder, a thermal curing agent, and a photoinitiator. More specifically, the PSA composition may include about 0.5 parts by weight to about 10.0 parts by weight of the thermal curing agent and about 0.001 parts by weight to about 0.05 parts by weight of the photoinitiator, based on 100 parts by weight of the acrylic PSA binder. It is noted that hereinafter "photocurable" and "UV-curable" may be used interchangeably in reference to the PSA composition, PSA acrylic binder, and PSA film. It is further noted that terminology such as "PSA film" and "photocurable PSA film" may be used interchangeably with reference to example embodiments.

The photocurable PSA composition may be used to form a photocurable PSA film. For example, in a manufacturing process of semiconductor devices, a wafer may be bonded to a substrate, e.g., a ring frame or an adhesive film, via the photocurable PSA film, followed by dicing of the wafer, i.e., cutting and separating the wafer into chips. Accordingly, the PSA film should exhibit sufficiently high adhesive strength between the wafer and the substrate during the dicing process, and sufficiently reduced adhesion between the resultant chips and the substrate after photocuring, e.g., via UV irradiation, to facilitate removal of the chips from the substrate, i.e., peeling of the chips off the substrate in a pick-up process. A detailed description of the PSA film formed of the PSA composition will be described in more detail below.

Acrylic PSA Binder

The acrylic PSA binder of the PSA composition may be fluorinated. In other words, the acrylic PSA binder may include at least one fluoro group, i.e., at least one covalently bound fluorine. The acrylic PSA binder may include at least one fluoro group in an amount of about 6 mol % to about 30 mol %, based on a total amount of the acrylic PSA binder. For example, the acrylic PSA binder may include the fluoro group in an amount of about 6 mol % to about 15 mol %. The fluoro group may reduce friction between the PSA film and a diced wafer after photocuring. As such, removal of chips attached to the PSA film in the pick-up process may be facilitated. It is noted that the amount of about 6 mol % to about 30 mol % may refer to an amount of the fluoro group in reactants and may also refer to an amount of the fluoro group in the acrylic PSA binder made by a polymerization reaction because the amount is preserved after the polymerization reaction is complete. It is further noted that the mol % of the fluoro group may be calculated by measuring isotope peaks with Nuclear Magnetic Resonance Spectroscopy (F-NMR), If the amount of the fluoro group in the acrylic PSA binder is less than about 6 mol %, adhesion strength of the PSA film including the PSA binder to the substrate after photocuring may remain, e.g., may be too high, so a number of defects during picking up of chips may be increased. If the amount of the fluoro group in the acrylic PSA binder is more than about 30 mol %, i.e., contents of other functional groups in the acrylic PSA binder are relatively low, polymerization of the monomer containing the fluoro group with other monomers in the PSA binder may be difficult and/or adhesion strength of the resultant PSA film may be improper, e.g., adhesion to the wafer may be too low. When the acrylic PSA binder includes the fluoro group in an amount larger than about 15 mol %, substantial adhesion changes, as compared to adhesive properties of a PSA film having the fluoro group in an amount of about 15 mol % may not be exhibited.

The acrylic PSA binder may include at least one fluoro group, at least one vinyl group, at least one hydroxyl group, and at least one epoxy group. For example, the acrylic PSA binder may contain about 6 mol % to about 30 mol % of the fluoro group, about 2 mol % to about 20 mol % of the epoxy group, and about 10 mol % to about 25 mol % of the vinyl group, based on a total amount of the acrylic PSA binder.

If an amount of the epoxy group in the acrylic PSA binder is less than about 2 mol %, the adhesion strength of the PSA film including the PSA binder to the ring frame before the photocuring may be poor, thereby causing vibration of the wafer during the dicing process, e.g., when using a blade.

Vibration of the wafer may, in turn, cause chip flying and/or separation of the resultant PSA film from the ring frame, e.g., ring-frame delamination. If the amount of the epoxy group in the acrylic PSA binder is more than about 20 mol %, a surface energy of the PSA film may be too high after the photocuring, i.e., short-term UV curing, so adhesion strength between the wafer chips and the PSA film may remain, e.g., may be too high, during the pick-up process. If adhesion remains between the wafer chips and the PSA film during the pick-up process, removal and/or peeling of the wafer chips from the PSA film may fail, e.g., cause a pick-up miss.

If an amount of the vinyl group in the acrylic PSA binder is less than about 15 mol %, a loss in adhesion strength after photocuring may be insufficient, resulting in a relatively high adhesion strength, i.e., relatively high peel strength, between the PSA film with the PSA binder and a corresponding substrate, e.g., a wafer or an adhesive film for die bonding. If the amount of the vinyl group in the acrylic PSA binder is more than about 20 mol %, flowability of the resultant PSA film may be deteriorated, thereby increasing adhesion strength of the PSA film to the substrate, which in turn, may increase peel strength with the base.

The acrylic PSA binder may have an acid value of about 1 or less. If the acid value of the acrylic PSA binder is greater than about 1, the acrylic PSA binder may gel when an acrylic monomer and a monomer having an epoxy group are simultaneously introduced to prepare the acrylic PSA binder, so physical properties of the resultant acrylic PSA binder may be changed over time after attachment to a substrate, e.g., lamination with a wafer or with an adhesive film for die bonding.

The acrylic PSA binder may be formed by mixing an acrylic polyol, i.e., a polymeric base, having a molecular weight of about 150,000 to about 600,000, a functional monomer, and a crosslinking agent. The acrylic PSA binder may have a molecular weight of about 150,000 to about 800,000. The use of the acrylic PSA binder may improve tackiness of the PSA composition, adhesive strength of the PSA composition to the substrate, and mechanical strength of the PSA composition.

More specifically, the preparation method of the acrylic PSA binder may include, e.g., a two-stage procedure. First, an acrylic monomer, an acrylate monomer having a hydroxyl group, an acrylate monomer having an epoxy group, an acrylate monomer having a fluoro group, and a polymerization initiator may be mixed, i.e., a polymerization reaction, to form the acrylic polyol. It is noted that the acrylic monomer may impart adhesion strength and may be selected as a main monomer, and the acrylate monomers with the functional groups may be added to the main monomer to finalize formation of the acrylic polyol. The acrylic polyol may be prepared, e.g., by a solution polymerization, using any suitable solvent, e.g., a solvent having a boiling point of about 60° C. to about 120° C. Examples of solvent may include one or more of ketone-based solvents, e.g., methyl ethyl ketone, ester-based solvents, e.g., ethyl acetate, alcohol-based solvents, e.g., acetone, aromatic solvents, e.g., toluene, and so forth. If needed, a catalyst and a polymerization inhibitor may be used in the polymerization reaction. The polymerization reaction can be carried out in a temperature range of about 80° C. to about 120° C. for about 1 hour to about 75 hours, e.g., about 5 hours to about 15 hours, to facilitate control of the molecular weight of the acrylic polyol. Once the acrylic polyol is formed, hydroxyl groups of the acrylic polyol may be reacted with an isocyanate group of a monomer having a vinyl group, i.e., a urethane addition reaction, as will be discussed in more detail below.

In the polymerization reaction to form the acrylic polyol, the acrylic monomer may be used in an amount of about 50 parts by weight to about 75 parts by weight. The acrylate monomer with the hydroxyl group may be used in an amount of about 15 parts by weight to about 30 parts by weight. The acrylate monomer with the epoxy group may be used in an amount of about 2 parts by weight to about 20 parts by weight. The acrylate monomer with the fluoro group may be used in an amount of about 2 parts by weight to about 10 parts by weight. A polymerization initiator may be used in an amount of about 0.1 parts by weight to about 0.5 parts by weight. It is noted that "parts by weight" of components in the acrylic polyol is based on 100 parts by weight of a total sum of weights of the acrylic monomer, the acrylate monomer with the hydroxyl group, the acrylate monomer with the epoxy group, and the acrylate monomer with the at least one fluoro group.

In the polymerization reaction to form the acrylic polyol, the acrylate monomer with the fluoro group may be used in an amount of about 2 parts by weight to about 10 parts by weight, e.g., about 2 parts by weight to about 5 parts by weight. Use of the acrylate monomer with the fluoro group in an amount of less than about 2 parts by weight may cause peel strength problems, e.g., relatively high adhesion strength between the resultant PSA film and a wafer, after photocuring. Use of the acrylate monomer with the fluoro group in an amount of more than about 10 parts by weight may cause a difficulty in polymerization and a problem in terms of adhesion strength, e.g., relatively low adhesion strength between the resultant PSA film and a wafer. Examples of the monomer with the fluoro group may include one or more of trifluoromethyl methacrylate, trifluoroethyl methacrylate, hexafluoropropyl methacrylate, heptadecafluorodecyl acrylate, and so forth.

In the polymerization reaction to form the acrylic polyol, the acrylic monomer may be in an amount of about 50 parts by weight to about 75 parts by weight. The acrylic monomer may impart adhesion strength to the PSA composition and the resultant PSA film. If the acrylic monomer is used in an amount of less than about 50 parts by weight, the adhesion of the PSA composition to a substrate, e.g., a wafer or a film for die bonding, before photocuring may be deteriorated, thereby causing chips to fly off during the dicing process. If the acrylic monomer is present in an amount of more than about 75 parts by weight, i.e., the acrylate monomers with the hydroxyl group and/or the epoxy group may be used in a relatively small amount, adhesion strength of the PSA composition after photocuring, i.e., UV irradiation, may not be sufficiently reduced, thereby making removal of chips in the pick-up process difficult.

The acrylic monomer may have a glass transition temperature lower than about (−10° C.), e.g., a glass transition temperature of about (−70)° C. to about (−20)° C., a glass transition temperature of about (−60)° C. to about (−30)° C., and so forth. When the acrylic monomer has a glass transition temperature above about (−10)° C., an initial adhesion strength of the PSA composition may be low, so adhesion of the resultant PSA film to the substrate upon dicing may be low. A low adhesion of the PSA film to the wafer upon dicing may cause peeling of the PSA film off the wafer or ring frame during dicing. Examples of the acrylic monomer may include one or more of 2-ethylhexyl methacrylate, isooctyl acrylate, 2-ethylhexyl acrylate, ethyl acrylate, n-butyl acrylate, isobutyl acrylate, octadecyl methacrylate, and so forth.

In the polymerization reaction to form the acrylic polyol, the acrylate monomer with the hydroxyl group may be used in an amount of about 15 parts by weight to about 30 parts by weight. Use of the acrylate monomer with the hydroxyl group in an amount of less than about 15 parts by weight may reduce a number of reactive sites therein, i.e., reactive sites for interaction with isocyanate groups in the monomer having a vinyl group, thereby causing a problem in terms of peel strength after photocuring. Use of the acrylate monomer with the hydroxyl group in an amount of more than about 30 parts by weight may increase tackiness of the PSA composition after photocuring, thereby causing a problem in terms of peel strength. Examples of the acrylate monomer with the hydroxyl group may include one or more of 2-hydroxyethyl methacrylate, hydroxyethyl acrylate, 4-hydroxybutyl acrylate, hydroxypropyl methacrylate, vinylcaprolactam, and so forth.

In the polymerization reaction to form the acrylic polyol, an amount of the acrylate monomer with the epoxy group may be in an amount of about 2 parts by weight to about 20 parts by weight. If the amount of the acrylate monomer with the epoxy group is less than about 2 parts by weight, the adhesion strength of the PSA film to the substrate may be reduced, e.g., may be poor. If the amount of the acrylate monomer with the epoxy group is more than about 20 parts by weight, a photocuring rate via UV irradiation may be deteriorated, thereby increasing peel strength, i.e., adhesion strength, of the PSA film for die bonding with respect to the substrate. Examples of the acrylate monomer with the epoxy group may include glycidyl methacrylate and/or glycidyl acrylate.

In the urethane addition reaction, i.e., a reaction between hydroxyl groups of the acrylic polyol and the monomer with the vinyl and isocyanate groups, an amount of the monomer with the isocyanate and vinyl groups may be adjusted with respect to an amount of the monomer having the hydroxyl groups in the acrylic polyol. For example, an equivalent ratio of the monomer having vinyl and isocyanate groups to the hydroxyl groups in the acrylic polyol may be about 0.5:1 to about 0.9:1. Examples of the monomer having the isocyanate and vinyl groups may include one or more of α,α-dimethyl-m-isopropenylbenzyl isocyanate, 2-isocyanatoethyl methacrylate, 2-isocyanatoethyl 2-propenoate, 1,1-bis(acryloyloxymethylethyl isocyanate), and so forth.

The acrylic polyol may be mixed with the monomer having the isocyanate and vinyl groups in the urethane addition reaction, so hydroxyl groups in the acrylic polyol may react with the isocyanate group of the monomer having the vinyl group in a presence of a catalyst at about 45° C. to about 55° C. for about 5 hours to about 15 hours, i.e., the urethane addition reaction, to form the acrylic PSA binder. Use of the urethane addition reaction between the hydroxyl and isocyanate groups according to example embodiments may introduce photocurable sites into the acrylic PSA binder. The urethane addition reaction may proceed by moderate heating and may exhibit high yield, thereby providing a reaction product that can be used without further purification. In contrast, a conventional chemical introduction of photocurable sites into a binder, i.e., use of a ring opening reaction between a carboxylic acid and epoxy groups and an acylation reaction between hydroxyl groups and an acid anhydride, may cause low yield and modification of the reaction product over time. In particular, use of the conventional chemical introduction of photocurable sites into a binder may cause the epoxy ring to open only in the presence of a base catalyst at a high temperature, so unreacted base catalyst may modify a resultant reaction product over time, e.g., when the reaction yield is not sufficiently high. The conventional acylation reaction procedure may be difficult to observe and may provide a low reaction yield.

Thermal Curing Agent

The thermal curing agent of the PSA composition may be any suitable thermal curing agent. Examples of the thermal curing agent may include one or more of 2,4-trilene diisocyanate, 2,6-trilene diisocyanate, hydrogenated trilene diisocyanate, 1,3-xylene diisocyanate, 1,4-xylene diisocyanate, diphenylmethane-4,4-diisocyanate, 1,3-bisisocyanatomethylcyclohexane, tetramethylxylene diisocyanate, 1,5-naphthalene diisocyanate, 2,2,4-methylhexamethylene diisocyanate, 2,4,4-methylhexamethylene diisocyanate, trilene diisocyanate adduct of trimethyrolpropane, xylene diisocyanate adduct of trimethyrolpropane, triphenylmethane triisocyanate, methylene bistriisocyanate, and mixtures thereof.

Photoinitiator

The photoinitiator of the PSA composition may be any suitable photoinitiator. Examples of the photoinitiator may include a mixture of an α-amino ketone type compound and a benzyl ketal type compound. The α-amino ketone type compound and the benzyl ketal type compound may have melting points of about 70° C. to about 75° C. and about 64° C. to about 67° C., respectively. The α-amino ketone type compound and benzyl ketal type compound may be added separately or as a mixture to a PSA layer, i.e., a PSA binder with a thermal curing agent, to allow a curing reaction to proceed in an efficient manner, e.g., with respect to a curing time and/or photocuring rate, so adhesion strength of the resultant PSA composition may be reduced after the photocuring, e.g., via UV irradiation.

According to another example embodiment, a photocurable PSA film may be formed of a photocurable PSA composition. The photocurable PSA composition may be coated on a film, e.g., a polyethylene terephthalate film, and may be dried to form the PSA film. The PSA film may be highly adhesive before photocuring, and may be exhibit reduced adhesion strength upon photocuring, e.g., via UV irradiation, to facilitate removal of chips in the pick-up process. The PSA film may be applied to a substrate, e.g., a wafer, an adhesive film for dicing/die bonding with an adhesive tape and/or die bonding material, and may protect the substrate. The PSA composition may be substantially the same as the PSA composition described previously and, therefore, its detailed description will not be repeated.

Formation of a PSA film according to example embodiments, i.e., including a photocurable PSA composition with fluoro and epoxy groups, may provide a PSA film with excellent slip properties, i.e., reduced friction, with respect to a substrate, e.g., a wafer or an adhesive film for die bonding, after UV irradiation. Such a PSA film may exhibit low peel strengths with respect to, e.g., an adhesive film for die bonding at different rates, thus facilitating peeling of chips in the pick-up process and allowing the PSA film to retain excellent peeling properties despite the use of a photocurable acrylic PSA binder having a molecular weight of about 150,000 to about 800,000. The PSA film may be suitable for use in a dicing PSA tape having an adhesive film layer for dicing or bonding.

EXAMPLES

Example 1

Reagents were mixed together and reacted in a 2 L four-neck flask equipped with a reflux condenser, a thermometer and a dropping funnel in accordance with the following procedure.

First, 300 g of ethyl acetate and 240 g of toluene, i.e., organic solvents, were added to the flask to form a first solution. The first solution was heated to 80-90° C.

Next, 431.88 g of 2-ethylhexyl acrylate (7A2150, Junsei Chemical Co., Ltd., Japan), 60 g of hydroxyethyl methacrylate (03120, Samchun, Korea), 60 g of hydroxyethyl acrylate (10132-0480, Junsei Chemical Co., Ltd., Japan), 30 g of glycidyl methacrylate (E10780, Samchun, Korea), 18 g (3 parts by weight based on 100 parts by weight of the first mixture) of trifluoromethyl methacrylate, and 0.12 g of benzoyl peroxide were mixed to form a first mixture.

The first mixture was added dropwise to the first solution in the flask through the dropping funnel to form a second mixture. The first mixture was added at 80-100° C. for 3 hours while stirring at 250 rpm. The second mixture was aged at the same temperature for 4 hours, and then 30 g of ethyl acetate and 1.2 g of azobisisobutyronitrile were added thereto to form a third mixture. The third mixture was left standing for 4 hours and was measured for viscosity and solids content. The reaction was stopped when the third mixture had sufficient viscosity and solid content, i.e., when the third mixture formed an acrylic PSA polyol exhibiting a viscosity of 300 to 500 cps and solids content adjusted to 40%.

Next, 2-Isocyanatoethyl methacrylate (Karenz MOI, Showa Denko, Japan) was added to the acrylic PSA polyol. The amount of the 2-isocyanatoethyl methacrylate added to the acrylic PSA polyol was 15 mol %, based on the solids content of the acrylic PSA polyol. Eight hours after the addition, 20 ppm dibutyltin dilaurate (DBTDL) was added to the mixture and allowed to react at 60° C. for 8 hours. When the isocyanate groups of the 2-isocyanatoethyl methacrylate molecules were completely reacted with the hydroxyl groups of the acrylic PSA polyol, i.e. when peaks corresponding to hydroxyl groups in the acrylic PSA polyol disappeared from the FT-IR spectrum, ethyl acetate was added to the reaction mixture to finalize a photocurable acrylic PSA binder having a solids content of 45%.

Next, 56 g of the photocurable acrylic PSA binder, 42 g of methyl ethyl ketone, 0.2 g of a mixture of photoinitiators (Irgacure 184, Irgacure 651, Ciba Chemical) and 1.8 g of an isocyanate curing agent (AK-75, Aekyung Chemical, Korea) were stirred for at least two hours to prepare a photocurable PSA composition.

Example 2 a photocurable PSA composition was formed in the same manner as in Example 1, except that the acrylic PSA polyol was formed by using 407 g of 2-ethylhexyl acrylate, 60 g of hydroxyethyl methacrylate, 60 g of hydroxyethyl acrylate, 30 g of glycidyl methacrylate, and 42 g (7 parts by weight based on 100 parts by weight of the first mixture) of trifluoromethyl methacrylate as monomers.

Comparative Example 1 a photocurable PSA composition was formed in the same manner as in Example 1, except that the acrylic PSA polyol was formed by using 449.88 g of 2-ethylhexyl acrylate, 60 g of hydroxyethyl methacrylate, 60 g of hydroxyethyl acrylate, and 30 g of glycidyl methacrylate as monomers, and 0.12 g of benzoyl peroxide.

Comparative Example 2 a photocurable PSA composition was formed in the same manner as in Example 1, except that the acrylic PSA polyol was formed by using 365.88 g of 2-ethylhexyl acrylate, 60 g of hydroxyethyl methacrylate, 60 g of hydroxyethyl acrylate, 30 g of glycidyl methacrylate, and 84 g (14 parts by weight based on 100 parts by weight of the first mixture) of trifluoromethyl methacrylate as monomers.

Measurement of Adhesion Strength and Peel Strength of Photocurable PSA Compositions Each of the PSA compositions prepared in Examples 1-2 and Comparative Examples 1-2 was coated on a polyethylene terephthalate film and dried to form a coating having a thickness of 6 to 12 μm. The coating was transferred to a polyolefin film and aged at 25-60° C. for 3-7 days to form a PSA film. The resultant PSA film was measured for adhesion strength and peel strength.

The adhesion strength of each coating was tested in accordance KS-A-01107 (8), i.e., Korean Industrial Standard Testing Procedure for PSA tapes and sheets. Hereinafter the procedure for determining peel strength may be referred to as a "peel strength test." In particular, in the peel strength test, each film sample, i.e., a sample having dimensions of (25 mm (w)×250 mm (l)), was attached to an adhesive film for die bonding and an adhesive tape was attached to a surface of the adhesive film. A press roller (load: 2 kg) was rolled on the stacked structure once at a rate of 300 mm/min to press the sample in the stacked structure. Thirty minutes after the pressing, a portion of the sample was folded, turned over 180°, and peeled (~25 mm) from the stacked structure. The adhesive film and the sample were fixed to an upper clip and a lower clip of a tensile tester (Instron Series 1X/s Automated materials Tester-3343), respectively. The required loads for peeling the sample at tensile rates of 6 mm/min, 50 mm/min, 300 mm/min, and 1,000 mm/min were measured. The peel test was repeated after irradiating each sample with UV using a high-pressure mercury lamp (luminance intensity of 70 W/cm$^2$, ARO8 UV, Aaron) for 3 seconds. In this experiment, five samples were tested at one time. Results are reported in Tables 1-2.

Measurement of Tackiness of Photocurable PSA Compositions

The tackiness of the samples, i.e., samples prepared in a substantially same way described previously with reference to measurement of adhesion and peel strengths, was measured using a probe tack tester (tacktoc-2000). Pursuant to the test method of ASTM D2979-71, a tip of a clean probe was brought into contact with each sample at a rate of 10±0.1 mm/sec and a contact load of 9.79±1.01 kPa for 1.0±0.01 sec, followed by separation from the sample. A maximum force required for the separation was defined as the tackiness value of the test piece. The results are reported in Tables 1-2.

Measurement of Pick-up Success Rate

An 8" diameter silicon wafer (thickness: 80 μm) was pressed on each of the samples obtained in Examples 1-2 and Comparative Examples 1-2 at 25° C. for 10 seconds and diced to a size of 16 mm×9 mm using DFD-650 (DISCO). Thereafter, the resultant film was irradiated with UV using a high-pressure mercury lamp (intensity of luminance: 70 W/cm$^2$, AR O8 UV, Aaron) at an exposure dose of 140 mJ/cm$^2$ for 2 seconds. A pick-up test was conducted on 200 chips positioned at a central portion of the silicon wafer using a die bonder (SDB-10M, Sansubg Mechatronics), and the pick-up success rate of the chips was measured. The pick-up success rate was measured at different pin-strokes in millimeter units.

TABLE 1

|  | Example 1 | | | | Example 2 | | | |
|---|---|---|---|---|---|---|---|---|
| Peel strength before UV irradiation at 300 mm/min | 1.221 (N/25 mm) | | | | 1.356 (N/25 mm) | | | |
| Peel strength after UV irradiation at different rates | 6 (mm/min) 0.0444 (N/25 mm) | 50 (mm/min) 0.0435 (N/25 mm) | 300 (mm/min) 0.0383 (N/25 mm) | 1,000 (mm/min) 0.0395 (N/25 mm) | 6 (mm/min) 0.0479 (N/25 mm) | 50 (mm/min) 0.0423 (N/25 mm) | 300 (mm/min) 0.0370 (N/25 mm) | 1,000 (mm/min) 0.0411 (N/25 mm) |
| Tackiness to SUS Ring Frame | Good | | | | Good | | | |
| Pick-up success rate at different pin-strokes (4 mm expanding) | 20 mm 20% | 25 mm 100% | 30 mm 100% | 35 mm 100% | 20 mm 15% | 25 mm 100% | 30 mm 100% | 35 mm 100% |

TABLE 2

|  | Comparative Example 1 | | | | Comparative Example 2 | | | |
|---|---|---|---|---|---|---|---|---|
| Peel strength before UV irradiation at 300 mm/min | 1.183 (N/25 mm) | | | | 1.295 (N/25 mm) | | | |
| Peel strength (N/25 mm) [max ...] at different rates (mm/min) after UV irradiation | 6 (mm/min) 0.0448 (N/25 mm) | 50 (mm/min) 0.0459 (N/25 mm) | 300 (mm/min) 0.0490 (N/25 mm) | 1,000 (mm/min) 0.0421 (N/25 mm) | 6 (mm/min) 0.1048 (N/25 mm) | 50 (mm/min) 0.0988 (N/25 mm) | 300 (mm/min) 0.0605 (N/25 mm) | 1,000 (mm/min) 0.0476 (N/25 mm) |
| Tackiness to SUS Ring Frame | Good | | | | Good | | | |
| Pick-up success rate at different pin-strokes (4 mm expanding) | 20 mm 5% | 25 mm 75% | 30 mm 90% | 35 mm 100% | 20 mm 0% | 25 mm 0% | 30 mm 50% | 35 mm 60% |

From the data shown in Tables 1-2, it can be seen that the peel strengths after UV irradiation at exposure dose of 150 mJ/cm$^2$ of the samples formed according to example embodiments, i.e., Examples 1-2, were lower than 0.05 N/25 mm at all tensile rates (6, 50, 300 and 1,000 mm/min). In contrast, the peel strengths of the comparative samples, i.e., Comparative Examples 1-2, after UV irradiation were higher than those of the samples of Examples 1-2 at all tensile rates. These results indicate that PSA compositions according to example embodiments showed larger differences in peel strength before and after UV irradiation than the comparative PSA compositions.

Further, the samples of Examples 1-2 showed success rates of 100% at a pin-stroke rate of 25 mm and higher, whereas defects were observed at pin-stroke rates higher than 25 mm in the comparative Examples. Although the peel strength results after UV irradiation were not absolutely proportional to the pick-up test results, it can be interpreted that there is a correlation between the results. The samples of Examples 1-2 are featured by low peel strengths at high rates. The peel strengths of the samples of Examples 1-2 at low rates were comparable to those of the comparative samples, but the peel strengths of the samples of Examples 1-2 were substantially lower, i.e., exhibited better results, than the Comparative Examples 1-2 high rates (300 and 1,000 mm/min.). The peel strengths measured at high rates are particularly effective for high-rate pick-up processes.

It is noted that the samples of Comparative Example 2 showed very poor results in terms of peel strength and pick-up success rate as compared to the samples of Examples 1-2. The glass transition temperature of the fluorinated polymer used in the Comparative Example 2 was relatively high due to the high content of fluoro groups in the polymer. Accordingly, UV irradiation increased the cohesive force of the samples in Comparative Example 2, so the peel strength of samples in Comparative Example 2 with respect to the substrate was not reduced after the UV irradiation. Particularly, the higher peel strengths of the samples of the Comparative Example 2 at lower rates made it difficult to peel the samples at the initial stage.

As apparent from the above description, the PSA film of example embodiments has a photocuring efficiency of at least 80% in the UV exposure dose range of 120 to 450 mJ/cm$^2$ and is highly curable even when the energy level is not maintained constant during photocuring (UV curing).

In addition, the PSA film has high adhesion strengths ($\geqq$1.0 N/25 mm) to adherends, e.g., wafers, adhesive films for die bonding and ring frames, before photocuring. Furthermore, the PSA film has excellent peeling properties after photocuring. Specifically, the PSA film has low peel strengths of about 0.05 N/25 or lower with respect to wafers and adhesive films for die bonding at different rates (6, 50, 300 and 1,000 mm/min). Therefore, the PSA film may be suitable for use in a dicing PSA tape having an adhesive film layer for dicing or die bonding.

Example embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A photocurable pressure-sensitive adhesive (PSA) composition, comprising:

an acrylic PSA binder, the acrylic PSA binder including at least one fluoro group in an amount of about 6 mol % to about 30 mol % based on a total amount of the acrylic PSA binder;
a thermal curing agent; and
a photoinitiator.

2. The composition as claimed in claim 1, wherein the composition includes about 0.5 parts by weight to about 10.0 parts by weight of the thermal curing agent and about 0.001 parts by weight to about 0.05 parts by weight of the photoinitiator, based on 100 parts by weight of the acrylic PSA binder.

3. The composition as claimed in claim 1, wherein the acrylic PSA binder includes at least one fluoro group, at least one vinyl group, at least one hydroxyl group, and at least one epoxy group.

4. The composition as claimed in claim 1, wherein the acrylic PSA binder includes at least one epoxy group in an amount of about 2 mol % to about 20 mol %, at least one vinyl group in an amount of about 10 mol % to about 25 mol %, and the amount of the at least one fluoro group is about 6 mol % to about 15 mol % based on the total amount of the acrylic PSA binder.

5. The composition as claimed in claim 1, wherein the acrylic PSA binder has an acid value of about 1 or less.

6. The composition as claimed in claim 1, wherein the acrylic PSA binder is a reaction product of a polyol having hydroxyl functional groups and a monomer having isocyanate and vinyl groups, the polyol being a reaction product of an acrylic monomer, an acrylate monomer with at least one hydroxyl group, an acrylate monomer with at least one epoxy group, and an acrylate monomer with at least one fluoro group.

7. The composition as claimed in claim 6, wherein the polyol includes the acrylic monomer in an amount of about 50 parts by weight to about 75 parts by weight, the acrylate monomer with the hydroxyl group in an amount of about 15 parts by weight to about 30 parts by weight, the acrylate monomer with the epoxy group in an amount of about 2 parts by weight to about 20 parts by weight, the acrylate monomer with the fluoro group in an amount of about 2 parts by weight to about 10 parts by weight, and a polymerization initiator in an amount of about 0.1 parts by weight to about 0.5 parts by weight.

8. The composition as claimed in claim 6, wherein an equivalent ratio of the monomer having isocyanate and vinyl groups to the hydroxyl groups in the polyol is about 0.5:1 to about 0.9:1.

9. The composition as claimed in claim 6, wherein the acrylic monomer includes one or more of 2-ethylhexyl methacrylate, isooctyl acrylate, 2-ethylhexyl acrylate, ethyl acrylate, n-butyl acrylate, iso-butyl acrylate, and octadecyl methacrylate.

10. The composition as claimed in claim 6, wherein the acrylic monomer has a glass transition temperature of about (−50)° C. or less.

11. The composition as claimed in claim 6, wherein the acrylate monomer with at least one hydroxyl group includes one or more of 2-hydroxyethyl methacrylate, hydroxyethyl acrylate, 4-hydroxybutyl acrylate, hydroxypropyl methacrylate, and vinylcaprolactam.

12. The composition as claimed in claim 6, wherein the acrylate monomer having at least one epoxy group includes glycidyl methacrylate or glycidyl acrylate.

13. The composition as claimed in claim 6, wherein the monomer having the isocyanate and vinyl groups includes one or more of 2-isocyanatoethyl methacrylate, α,α-dimethyl-m-isopropenylbenzyl isocyanate, 2-isocyanatoethyl 2-propenoate, and 1,1-bis(acryloyloxymethylethyl isocyanate).

14. The composition as claimed in claim 6, wherein the monomer having at least one fluoro group includes one or more of trifluoromethyl methacrylate, trifluoroethyl methacrylate, hexafluoropropyl methacrylate, and heptadecafluorodecyl acrylate.

15. The composition as claimed in claim 1, wherein the acrylic PSA binder has a weight average molecular weight of about 150,000 to about 800,000.

16. A pressure-sensitive adhesive (PSA) film, comprising a dried photocurable PSA composition, the PSA composition including:
an acrylic PSA binder, the acrylic PSA binder having at least one fluoro group in an amount of about 6 mol % to about 30 mol % based on a total amount of the acrylic PSA binder;
a thermal curing agent; and
a photoinitiator.

17. The PSA film as claimed in claim 16, wherein a peel strength of the PSA film with respect to a substrate attached thereto is about 0.05 N/25 mm or less after photocuring as determined by KS-A-01107(8).

18. A method of forming a photocurable pressure-sensitive adhesive (PSA) composition, comprising:
forming an acrylic PSA binder, the acrylic PSA binder including at least one fluoro group in an amount of about 6 mol % to about 30 mol % based on a total amount of the acrylic PSA binder;
adding a thermal curing agent; and
adding a photoinitiator.

19. The composition as claimed in claim 1, wherein the amount of the at least one fluoro group is about 6 mol % to about 15 mol % based on the total amount of the acrylic PSA binder.

20. The composition as claimed in claim 1, wherein the acrylic PSA binder is a reaction product of a polyol, and the polyol is a reaction product of an acrylic monomer, an acrylate monomer with at least one hydroxyl group, an acrylate monomer with at least one epoxy group, and an acrylate monomer with at least one fluoro group, the polyol including the acrylate monomer with the fluoro group in an amount of about 3 parts by weight to about 7 parts by weight based on a total weight of the polyol.

* * * * *